United States Patent [19]

Miller

[11] Patent Number: 4,872,899

[45] Date of Patent: Oct. 10, 1989

[54] TREATMENT OF PLANT CHLOROSIS WITH RHODOTORULIC ACID

[75] Inventor: Gene W. Miller, Providence, Utah

[73] Assignee: Utah State University Foundation, Logan, Utah

[21] Appl. No.: 54,088

[22] Filed: May 22, 1987

Related U.S. Application Data

[63] Continuation of Ser. No. 718,858, Apr. 2, 1985.

[51] Int. Cl.$^4$ .............................................. C05F 11/00
[52] U.S. Cl. .......................................... 71/11; 71/27; 71/903; 71/DIG. 2; 71/92
[58] Field of Search ...................... 71/92, DIG. 2, 11

[56] References Cited

U.S. PATENT DOCUMENTS

| | | | |
|---|---|---|---|
| 2,854,791 | 10/1958 | Antognini | 71/DIG. 2 |
| 2,855,285 | 10/1958 | Antognini | 71/DIG. 2 |
| 3,365,287 | 1/1968 | Zaehner | 71/1 |
| 3,758,540 | 9/1973 | Martell | 71/DIG. 2 |
| 3,901,890 | 8/1975 | Isowa et al. | 260/268 |
| 3,912,589 | 10/1975 | Smith et al. | 195/29 |
| 3,960,536 | 6/1976 | Dumont et al. | 71/DIG. 2 |
| 4,017,512 | 4/1977 | Isowa et al. | 260/326 |
| 4,181,742 | 1/1980 | Horiuchi et al. | 426/12 |
| 4,269,850 | 5/1981 | Rogers | 424/279 |
| 4,311,689 | 1/1982 | Ruddock | 424/1 |
| 4,359,477 | 11/1982 | Rogers | 424/287 |
| 4,367,289 | 1/1983 | Kaneko et al. | 435/133 |

OTHER PUBLICATIONS

Allnutt et al, "Characteristics of Iron Uptake from Hydroxamate Siderophores, etc.," 7 J. of Plant Nutrition, pp. 427–435 (1984).
Atkin et al II, "Leaf Infections: Siderochromes (Natural Polyhydroxamates), etc.,", 176 Science, pp. 300–302 (1976).
Miller et al, "Iron Chlorosis: The Role of Iron in Chlorophyll Formation," , Utah Science, pp. 99–104 (1983).
Orlando et al, "Ferrichrome Compounds as a Source of Iron for Higher Plants", 99 Chem. Abs. 3215d (1983).
Stutz, "Aufnahme von Ferrioxamin B durch Tomatenpflanzen," 20 Experimentia 403 (1964).
Cline et al, "Effects of a Hydroxamate Siderophore on Iron Absorption, etc.," 76 Plant Physiol. pp. 36–39 (1984).
Atkin et al. I, "Rhodotorulic Acid, a Diketopiperazine Dihydroxamic Acid, etc", 7 Biochemistry 3734–3739 (1968).
Powell et al, "Hydroxamate Siderophores etc", CA 97 108939e (1982).
Szanislo et al, "Production of Hydroxamate etc", Mycologia (73) 1158–1174 (1981).
Cline, "The Abilities of Hydroxamate etc", CA 101:107672b (1984).
Committee on Medical and Biological Effects of Environmental Pollutants, Subcommittee on Iron (Committee, etc.), Iron, pp. 39–78 (1979).
Committee on Medical and Biological Effects of Environmental Pollutants, Subcommittee on Iron, "Iron and Plants," Iron at 57 (1979).
Ciba–Geigy Corp., "Sequestrene," Agricultural Division, Technical Bulletin (1976).
Miller, "Iron Chlorosis: The Role of Iron in Chlorophyll Formation," Utah Science at 99 (1983).
Wallace, "Current Topics in Plant Nutrition"(1966).
Wallace, "A Decade of Synthetic Chelating Agents in Inorganic Plant Nutrition", (Jul. 1962).
Powell et al., "Occurrence of Hydroxamate Siderophore Iron Chelates in Soils", 287 Nature 833 (1980).
Reid et al., "Utilization of Iron by Oat When Supplied as Ferrated Synthetic Chelate or as Ferrated Hydroxamate Siderophore," 7 Journal of Plant Nutrition 437 (1984).
Smith et al., "Rhizobactin, A Siderophore from Rhizobium Meliloti", 7 Journal of Plant Nutrition 449 (1984).

*Primary Examiner*—Glennon H. Hollrah
*Assistant Examiner*—A. A. Owens
*Attorney, Agent, or Firm*—Workman, Nydegger & Jensen

[57] ABSTRACT

A method and composition for the treatment of iron chlorosis in plants using hydroxamic acid-type siderophores. Siderophores of this type are ferric-specific chelators, which are produced by certain microorganisms grown in iron-free environments. The current invention contemplates the use of the siderophore rhodotorulic acid to treat and prevent iron chlorosis. Rhodotorulic acid is produced by the yeast Rhodotorula pilimanae. The siderophore may be applied to the plant by a variety of methods including by soil application, foliar spray or direct injection into the plant.

21 Claims, 3 Drawing Sheets

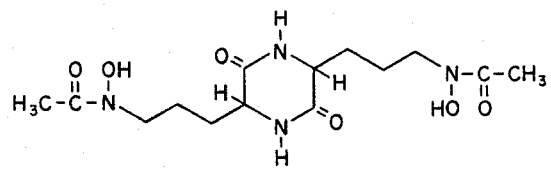
RHODOTORULIC ACID
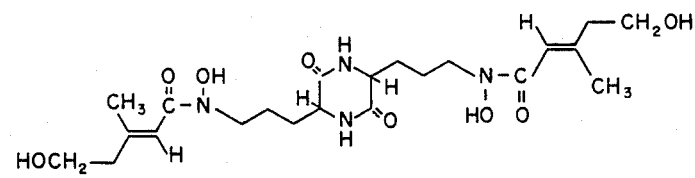
DIMERUMIC ACID
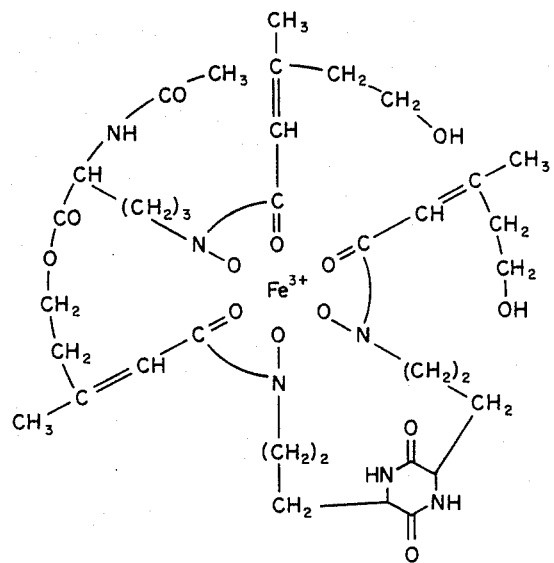
FERRIC COPROGEN

TREATMENT OF PLANT CHLOROSIS WITH RHODOTORULIC ACID

Related Applications

This application is a continuation of copending U.S. application Ser. No. 06/718,858 filed Apr. 2, 1985, entitled "Treatment of Plant Chlorosis with Rhodotorulic Acid".

BACKGROUND

1. The Field of the Invention

This invention relates to the treatment of plant chlorosis and particularly to the use of chelating agents such as rhodotorulic acid in the treatment and prevention of iron chlorosis in plants.

2. The Prior Art

Plants are generally considered to be autotrophic; that is, plants are generally capable of synthesizing their own foods. Nutrition in plants, therefore, is in large measure a process of providing to the plants: light, minerals, and other chemical substances necessary to allow them to photosynthesize required organic compounds.

In order to maintain proper nutrition and to sustain growth and productivity, most plants require sixteen essential nutrients. Three of the essential nutrients (carbon, oxygen, and hydrogen) are extracted primarily from the air and water. The remaining thirteen essential nutrients are minerals and must be absorbed through the roots from the surrounding soil. These thirteen minerals include calcium, magnesium, sulfur, nitrogen, phosphorus, potassium, iron, manganese, copper, zinc, molybdenum, chlorine, and boron.

It has been found that each of the sixteen mineral nutrients listed above is necessary for the growth and well-being of the plant. While some of these minerals are required only in trace amounts, they are, nevertheless, absolutely essential to normal plant growth. It has, fact, been concluded that no essential mineral is more essential than the others, regardless of the amounts required. See Miller and Pushnik, "Iron Chlorosis," *Utah Science* 99 (Winter 1983).

As mentioned above, one of the essential minerals for normal plant growth is iron. Iron performs a variety of functions within the plant; for example, iron is essential for the proper functioning of photosynthesis within the plant. Particularly, iron is essential to the production of chlorophyll, which in turn is essential for the operation of photosynthesis.

Most of a plant's iron is found in the chloroplasts, the organelles responsible for photosynthesis. Chloroplast iron is found in a variety of forms, including: phytoferretin, a non-toxic protenaceous iron storage compound; various cytochromes, essential for electron transport; and iron-sulfur proteins (ferredoxin), also necessary for electron transport. See Miller and Pushnik, supra. It is important to note that a constant supply of iron is required in order to supply the plant with these and other compounds since iron is relatively immobile within the plant and does not readily move from older plant parts to new growth.

In certain geographical areas with certain types of soils, plants have difficulty in maintaining a constant and adequate iron supply. In these geographical areas, iron deficiency in plants may become an acute problem. Among the symptoms of iron deficiency is a yellowing of the plant, particularly a yellowing of the leaves. As expected, this yellowing results from the close association between iron and the chloroplasts, the production of chlorophyll, and the operation of photosynthesis within the plant. If the supply of iron is restricted, there will be a reduced supply of chlorophyll, a corresponding reduction in photosynthesis and a resulting yellowing of the plant.

Iron deficiency in plants and the resulting yellowing of the leaves is generally known as iron chlorosis. Iron chlorosis is a widespread and serious problem in many geographic regions, and it is particularly common and pronounced in arid and semi-arid regions. Typically, soils in which iron chlorosis is a serious problem are calcareous soils (i.e., high in lime content) which often also have a high pH. This type of soil is also common in the arid and semi-arid areas where iron chlorosis is most often found.

Investigators have concluded that some of the major causes of iron chlorosis include a poor iron supply, high soil pH, excessive calcium carbonate in the soil, high levels of bicarbonate in the soil or irrigation water, excessive irrigation, high concentrations of phosphate, high concentrations of heavy metals, extreme temperatures, high light intensities, poor aeration and several other related factors. Many of these factors are found in arid and semi-arid regions having alkaline, calcareous soils.

Indeed, several of these factors may operate simultaneously in areas having iron chlorosis problems. For example, soils in arid or semi-arid areas are very likely to have a high pH, a high level of calcium carbonate, and at the same time require regular irrigation. These same areas are likely to be exposed to extreme temperatures and high light intensities. When several of these factors act simultaneously, the probabilities of severe iron chlorosis substantially increase.

The ultimate result of iron chlorosis problems in certain soils and geographic areas is that many types of plants cannot be successfully grown. Any type of plant which lacks a high capacity for absorbing iron will be susceptible to iron chlorosis and the resulting reduction in photosynthesis. However, most types of vegetables, fruits, and berries are particularly susceptible to iron chlorosis.

As a result, areas having high pH calcareous soils, as expected, often have a limited scope of possible crop production. Agricultural production may well be limited to grasses, alfalfa, and certain grains, or crop production may be prevented entirely; production of fruits and vegetables and many other commercial crops is likely to be severely limited.

One of the major factors in the development of iron chlorosis in plants appears to be the specific plant's capability to accept iron in certain forms. Plants are generally more capable of accepting iron in its ferrous ($Fe^{+2}$) state. As a result, even if there is an abundance of iron in the surrounding soil, iron chlorosis may develop if the iron in the soil exists primarily in the ferric ($Fe^{+3}$) state.

In addition, it has been shown that certain strains of plants are more capable than others of obtaining iron from the soil. Strains of plants which are more capable of accepting iron have been shown to be capable of absorbing the iron through a mechanism whereby the roots of the plant acidify the surrounding soil. This acidification process results in a change of the soil chemistry which converts available iron to a form in which it is more readily absorbed by the plant.

The difficulty plants encounter in obtaining iron from high pH calcareous soils can be more fully understood by reviewing iron chemistry generally. As mentioned above, plants are much more capable of receiving iron in its ferrous form than in its ferric form. However, in the high pH environment of many soils which exist in arid and semi-arid regions, particular in calcareous soils, iron is much more likely to exist in the ferric ($Fe^{+3}$) form.

In addition, in high pH soils, the soils themselves may tend to bind available iron. This results in insoluble salts of iron associated with compounds present in the soil such as $CO_3^{-2}$, $OH^-$, $HCO_3^-$ and phosphate forms ($PO_3^{-3}$, $HPO_4^{-2}$ and $H_2PO_H^-$). Iron oxides are particularly insoluble.

The calcareous soils in which iron chlorosis is commonly found contain a large amount of calcium carbonate (lime). Calcium ($Ca^{+2}$) is prevalent in this type of soil and is able to effectively compete with iron to be ingested by plant roots. For example, in order to effectively compete with soluble iron in the soil environment, calcium must exist in an approximately 550:27 calcium to iron ratio.

In this type of soil, however, it is not unusual for the soluble calcium to iron ratio to be on the order of $10^{10}$:1. It is apparent, therefore, that iron may not be capable of effectively competing with calcium for entry into the roots of plants because of the large concentration of calcium. A further problem is that the presence of calcium carbonate in the soil tends to reduce the solubility of iron. This decrease in solubility correspondingly decreases the available iron for absorption by plants growing in the soil.

Many attempts have been made to cure or prevent iron chlorosis. One such attempt has been to inject an iron solution directly into the plant. Problems with this method are clear. Each plant must be individually treated. As a result, this method is not practical for most crops, but rather is limited to use in treating large trees and other similar types of crops. In addition, the expense involved in treating each individual plant is generally prohibitive, particularly when it is remembered that plants require a constant supply of iron; hence, constant, repeated applications of iron are required.

Another attempt to treat iron chlorosis has been the use of foliar sprays of iron solutions. Solutions containing iron sulfate have, for example, been used as sprays and have been applied directly to the plant. One major problem encountered in using such sprays is that they result in a few green spots on the plant's leaves where the iron sulfate spray contacts the plant, rather than a general greening of the plant as a whole. This would be expected because of the limited mobility of iron once it enters the plant.

A further attempt to treat iron chlorosis has involved adding iron directly to the soil. However, this procedure has proven less than satisfactory. The iron added is often rapidly converted to the unusable forms of iron which already exist in the soil or it may be bound by the soil itself. In addition, repeated, expensive additions of iron are likely to be required in order to maintain the constant supply of iron which plants require.

A related attempt to treat iron chlorosis has involved the addition of acid to the soil. This treatment, in theory, would lower the soil pH allowing iron to exist in its more soluble and usable forms. Due, however, to the huge buffering capacity of soils, the direct addition of acids has been found less than satisfactory.

An additional method of treatment which has enjoyed more favorable results is the addition of an iron chelating agent to the soil. These agents are also sometimes known as ferric sequestering agents. Some iron chelating agents which have proven successful include the iron chelate of ethylenediamine tetra-acetic acid (EDTA) or ethylenediamine (di (co-hydroxyphenyla-cetic acid) (EDDHA). In high pH, highly calcareous soils EDTA is unsatisfactory. Only chelates with a very high stability constant for iron such as EDDTA are reasonably successful in delivering iron in usable form to the roots or leaves of plants.

Chelates and chelating agents have been applied using a variety of methods. Soil application appears to be the most effective method of application, although chelate sprays have also been employed. The period of time over which chelates are effective varies depending on the type of soil and the type of plant. However, it is generally found that existing chelates and chelating agents must be applied at least once each year.

One major problem with the use of existing chelates in the treatment of iron chlorosis is cost. For many applications, the use of existing chelates is just not economically justifiable. For example, one form of EDDHA sold by CIBA-Geigy Corporation under the name Sequestrene® (chel 138) presently costs about $90.00 per five pounds. The extensive use of this compound over numerous acres of crops is simply not economically possible.

The use of chelating agents to solve the problem of iron chlorosis, however, appears to be a very promising treatment, particularly if a low cost iron chelating agent could be developed. Thus, what is needed in the art are compositions which are capable of effectively treating or preventing iron chlorosis. It would be a significant advancement in the art if effective methods for treating iron chlorosis were inexpensive to employ and if the essential compositions could be inexpensively produced. It would also be an advancement in the art if such methods and compositions were capable of treating iron chlorosis for extended periods of time without repeated application of the compounds. Specifically, it would be an advancement in the art to provide an iron chelating agent having the characteristics described above which further avoids the problems encountered in using prior art iron sprays, soil additives, and expensive chelating agents. Such methods and compounds are disclosed and claimed herein.

BRIEF SUMMARY AND OBJECTS OF THE INVENTION

The present invention relates to methods and associated compositions for treating and preventing iron chlorosis in plants.

As mentioned above, the lack of iron in a form usable to plants is a problem that plagues many areas (particularly arid and semi-arid areas) having calcareous soils. Iron may be present in these soils, but it is generally insoluble and immobile and most likely exists in the ferric ($Fe^{+3}$) state. Furthermore, the iron present may be insoluble (iron oxides) or may be required to compete with substances such as calcium, in order to be taken up by the plant.

As a result, the present invention employs an iron chelating agent to deliver iron in soluble, usable form, to the plant. It has been found that microorganisms which develop iron-deficiency stress, particularly in an alkaline environment, secrete ferric-specific chelators known as siderophores. Some plants, when subjected to iron deficiency stress, are able to derive their iron requirement from siderophores.

Generally, two types of siderophores exist. These include the catechol-like substances found only in bacteria and the hydroxamate-like compounds isolated from fungi, yeast, and bacteria. The current invention involves using siderophores of the latter type to treat and prevent iron chlorosis.

In one preferred embodiment of the current invention, a hydroxamate siderophore is isolated from a strain of yeast. The siderophore is known as rhodotorulic acid and is produced in high concentrations under iron deficient conditions from cultures of the red yeast *Rhodotorula pilimanae*. Rhodotorulic acid has been identified as substituted δ-N-hydroxyl-L-ornithine. Rhodotorulic acid has been found to be an efficient iron chelating agent which is capable of binding iron in the soil and then presenting it to a plant in a usable, soluble form. It may also be added to the soil in a ferrated rhodotorulic acid form, where the chelated iron is available for plant use.

The hydroxamate siderophore, such as rhodotorulic acid, may be applied to the plant in a number of ways. It is possible to prepare a foliar spray containing the ferrated siderophore. Such a spray would, of course, simply be sprayed onto the plant as necessary. It is expected, however, that soil application of the ferrated siderophore or siderophore will provide more beneficial results in most situations. Soil application will allow the ferrated siderophore to more continuously provide a supply of iron to the roots. The iron is released at the root surface and the siderophore then is free to chelate further iron. As a result, frequent repeated applications of the siderophore chelating agent are unnecessary.

Rhodotorulic acid can be easily and inexpensively produced. It is produced in volume at little expense by simply placing a culture of the red yeast *Rhodotorula pilimanae* in an iron-deficient environment.

It will be appreciated, therefore, that it is a general object of the present invention to provide methods for treating and preventing iron chlorosis in plants.

It is a related object of the present invention to provide compositions capable of treating and preventing iron chlorosis in plants.

It is a further object of the current invention to provide compositions for treating and preventing chlorosis in plants which are easy and inexpensive to produce.

It is a still further object of the current invention to provide compositions which are efficient iron chelating agents and which are capable of delivering iron to a plant in soluble, usable form even in an alkaline environment.

It is also an object of the current invention to provide methods for treating and preventing iron chlorosis in plants which are simple to apply and do not require frequent reapplication.

DETAILED DESCRIPTION OF THE PREFERRED EMBODIMENTS

Figure 1:
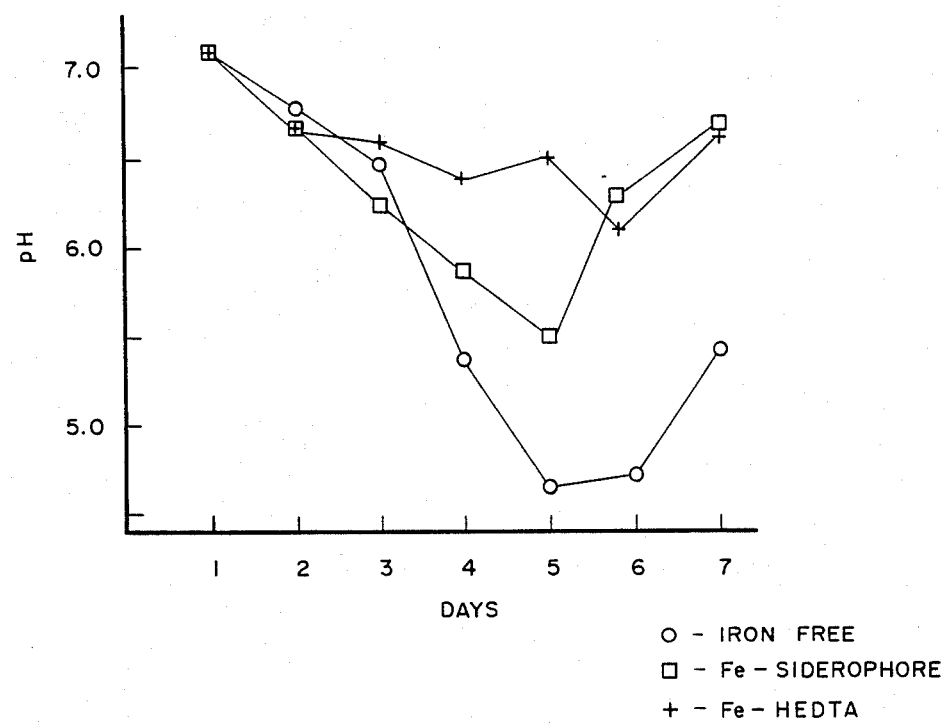
FIG. 1 is a graphical presentation of data indicating the changes in solution pH over time in moderately iron-stressed tomatoes.

The present invention relates to the use of iron chelating agents to deliver iron in usable form to plants. More particularly, the current invention relates to the use of iron chelators to treat or prevent an iron deficiency condition in plants known as iron chlorosis.

As mentioned in the discussion above, the occurrence of iron chlorosis is particularly common in arid and semi-arid areas, particularly where the soils are calcareous. Thus, one application of the current invention will be to use iron chelating agents and iron chelates to encourage more diversified plant growth in areas now afflicted with iron chlorosis.

The present invention contemplates the use of iron chelators which are excreted by microorganisms under iron deprivation conditions. These iron chelators are known as siderophores (sometimes referred to as "siderochromes"). Siderophores are of two general types and include the catechol-like compounds produced exclusively by bacteria and the hydroxamate-like compounds produced by fungi, yeast, and bacteria. Specifically, the present invention contemplates the use of iron chelators of the hydroxamate-like class as a treatment for iron chlorosis.

In one preferred embodiment of the present invention, a hydroxamate of the type discussed above is isolated from a culture of red yeast known as *Rhodotorula pilimanae*. The yeast is grown in an iron-deficient liquid medium and excretes large quantities of a secondary hydroxamic acid, commonly known as rhodotorulic acid.

Methods of producing rhodotorulic acid from this strain of red yeast are well known and described in the art. For example, a description of the production and isolation of rhodotorulic acid from yeast is contained in Atkin et al. "Rhodotorulic Acid, a Diketopiperazine Dihydroxamic Acid with Growth-Factor Activity, I. Isolation and Characterization," 7 *Biochemistry* 3734 (October 1968). Once production of rhodotorulic acid is complete, the yeast may be precipitated by centrifugation. Rhodotorulic acid is then removed from the supernatant liquid by evaporation and removal of the crystalline rhodotorulic acid.

Iron may then be added to the rhodotorulic acid solution to form a ferric hydroxamate complex. This complex is red at neutral pH and with decreasing pH changes to a red-purple or wine color, as described by Atkin et al. above.

The iron chelate formed by rhodotorulic acid has been found to have the stability necessary to function effectively as a treatment for iron chlorosis. The stability constants of siderophore complexes set the thermodynamic limits at which the siderophore can successfully compete for iron with existing physical and biologic reactions. The high iron siderophore stability constants allows them to both maintain ferric iron species in solution at neutral and alkaline pHs, as well as improving the competitive nature of the siderophore iron binding relative to soil sequestering reactions (e.g. soil colloid binding of soil solution cations). Chelates having a high stability constant for iron hold the iron successfully in the soil against soil precipitating factors and only release it at the root surface for use by the plant.

Ferrated rhodotorulic acid has been found to have a stability constant in excess of $10^{30}$. This compares favorably with the iron chelate of EDDHA (FeEDDHA), which is known to be a relatively effective treatment for iron chlorosis. In addition, the stability constant of ferrated rhodotorulic acid exceeds that of FeEDTA, another iron chelate widely used in the treatment of iron chlorosis.

As discussed above, ferric specific carrier molecules such as rhodotorulic acid are generally referred to as siderophores. Siderophores are produced by certain microorganisms (such as red yeast) in environments low in either absolute or available iron concentrations. The lower the iron concentration—the higher the rate of production of siderophores. For example, at less than about 1 microgram-atom iron/liter, production of siderophores by the red yeast *Rhodotorula pilimanae* reaches approximately 10 grams/liter.

Siderophores of the rhodotorulic acid type are very water soluble; in addition, siderophores are generally low in molecular weight (in the range of from about 300 to 1000). With respect to the present invention, water solubility and corresponding low molecular weight is critical in a chelating agent since the primary function of the chelating agent is to solubilize available iron in an alkaline environment. Rhodotorulic acid and related hydroxamic acid-type siderophores have been found to be particularly efficient for that task.

Hydroxamate siderophores related to rhodotorulic acid are produced principally in genera of yeast, fungi and some molds in response to low iron availability. Siderophores of the rhodotorulic acid family all contain the diketopiperazine of N-acyl-δ-N-hydroxyl-L-ornithine. Rhodotorulic acid has the following structure:

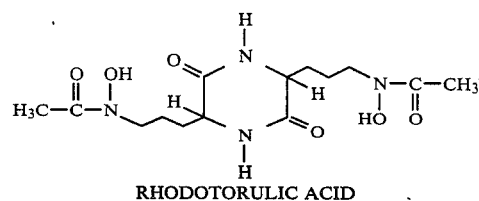
RHODOTORULIC ACID

Other members of the rhodotorulic acid family include dimerumic acid and ferric coprogen which are produced by Fusarium dimerum and Neurospora respectively and are illustrated as follows:

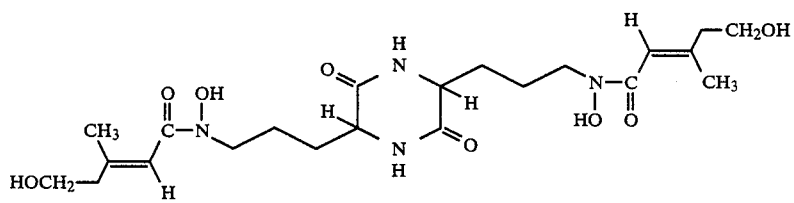
DIMERUMIC ACID

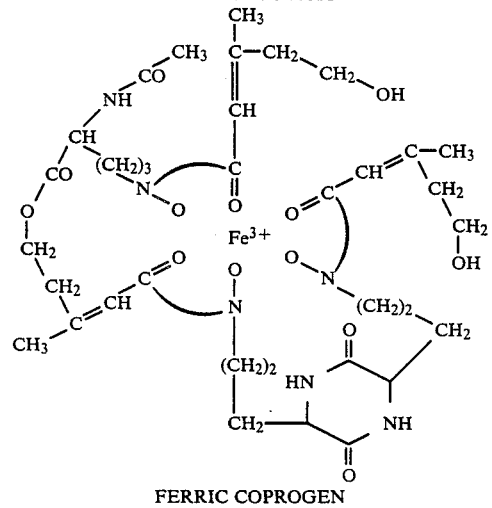
FERRIC COPROGEN

In order to fully understand and appreciate the current invention, it is necessary to understand the basic behavior and chemistry of iron. Soils generally contain an abundance of iron. Even those calcareous soils which are known to produce chlorotic plants generally do not have a deficiency of iron; these soils simply contain iron in an unusable (insoluble) form. For example, it is known that for every unit of soil pH above 4.0, the solubility of $Fe^{+3}$ in the soil environment decreases by a factor of 1,000. As a result, it is clear that iron chlorosis is not necessarily caused by a shortage of iron, but rather is caused by a shortage of available, usable iron.

In order to present iron in a usable form to growing plants, it is necessary to solubilize the iron. It is found that siderophores of the rhodotorulic acid type are efficient at binding iron and the chelate formed by the ligand (siderophore) is probably very soluble and probably not absorbed by plants. As a result, it is found that chelating agents of this type are effective in treating iron chlorosis.

The reasons for the effectiveness of this type of chelating agent are easily understood when viewed in connection with general plant chemistry. Iron plays an important role in the process of photosynthesis within plants. Iron is, for example, an important element in the production of chlorophyll, and chlorophyll is, of course, necessary for the formation of sugars and energy within plants through photosynthesis. In summary, it can be appreciated that iron is necessary to produce chlorophyll, which is in turn necessary to carry out photosynthesis, which in turn is necessary for the normal growth and development of the plant.

As discussed previously, certain environmental conditions may limit a plant's ability to absorb iron. In high pH, calcareous soils, for example, the iron found is generally insoluble and unusable. Under these conditions plants may exhibit an "iron-stress-response" mechanism during which the plant's roots attempt to change the ambient soil conditions by acidifying the soils and secreting iron reducing chemicals. These responses increase the $Fe^{+3}$ solubility and also reduce $Fe^{+3}$ to $Fe^{+2}$ which is more directly absorbable by plants.

The present invention aids plants in responding to iron stress conditions by the addition of ferric-specific chelating agents, such as siderophores, which complement the plant's own response mechanisms. When a plant is unable to secrete sufficient acids and reductants over a sustained period of time, the added siderophores will continue to present iron to the plant in usable form.

In order to treat iron chlorosis, the hydroxamic acid siderophore rhodotorulic acid is produced by the *Rhodotorula pilimanae* strain of red yeast grown in an essentially iron-free environment, according to the procedure discussed above. Once the siderophore is isolated, it is applied to growing plants or to soil as a treatment for iron chlorosis.

Various methods of application are possible, and each may be preferred under certain circumstances. One method of application is in the form of a foliar spray. A solution of rhodotorulic acid is obtained, and iron is added to the solution to create a solution of the ferrated chelate of rhodotorulic acid. The concentration of the solution is then adjusted as required, and the solution sprayed onto the plants.

Depending on the plant species, the spray solution would contain from 0.5 gram to 2 grams of ferrated rhodotorulic acid per liter of water. A wetting agent (few drops of a detergent) such as Tween 80 would be used. New growth of plants would be sprayed in early spring and depending on the severity of chlorosis resprayed several times during the growing season.

Plants were sprayed with ferrated siderophore at iron concentrations of 50 to 250 ppm. All spray solutions contained a wetting agent.

An alternative method of application involves producing the ferrated siderophore as described and then adding it directly to the soil. This method of application is preferred for a wide variety of situations. The addition of the siderophore to the soil should, under many conditions, provide benefits to growing plants over a relatively long period of time. The siderophore is not believed to be readily absorbed by plants; thus, its useful life in the soil is extended, as compared to the prior art methods for treating chlorosis.

The ferrated rhodotorulic acid would be added to the soil as a drench, added to the soil near the root zone of plants or banded near the root zone of row crops (commercial crops, vines, trees). For small shrubs 1 to 5 oz. of siderophore would be added per plant. Mature trees would receive from $\frac{1}{8}$ to $\frac{1}{2}$ pound/tree, and for fruit trees, such as cherries, apricots, peaches, $\frac{1}{4}$ to 3 oz. of siderophore would be added per inch of trunk diameter. Crops such as raspberries and strawberries would receive $\frac{1}{4}-\frac{3}{4}$ pounds per 100 foot rows. The level of application depends on severity of chlorosis and plant species.

Another method of application involves direct inoculation of plants with a solution of the ferrated siderophore. It may also be applied as a powder to drilled holes in tree trunks. These methods have somewhat limited application, however, they are expected to be important in treating iron chlorosis in large, valuable plants such as trees and ornamental shrubs, or plants in a "back yard" setting.

A further method of treating and preventing iron chlorosis in plants according to the present invention involves adding the yeast *Rhodotorula pilimanae* directly to the soil. In iron deficient environments, as has been discussed above, this yeast secretes large quantities of the siderophore rhodotorulic acid. Thus, the yeast added directly to the soil can assist in producing a constant supply of an efficient chelating agent for presenting iron in usable form to plants growing in the treated soil.

Experimental Results

The ability of "iron-efficient" (T3238 FER) and "iron-inefficient" (T3238 fer) tomato varieties to assimilate and utilize iron complexed in the siderophore rhodotorulic acid were studied. These tomato varieties were used as test plants and were classed as "iron-efficient" if they responded to iron-deficiency by inducing biochemical reactions of the type discussed above that make iron available in a useful form, and "iron-inefficient" if they did not respond to iron-stress.

Iron-efficient dicots such as tomatoes develop specialized "transfer cells" in the roots. These cells contain a larger number than usual of mitochondria. These organelles are known as "powerhouses" of the cell and provide energy by indirectly maintaining a proton (hydrogen ion) gradient across the membrane. Such transfer cells may be the source of the hydrogen ions that are secreted from the roots ultimately lowering the pH of the growing medium in contact with the root. The lowered pH has a reducing potential, changing the iron from a ferric ($Fe^{+3}$) to ferrous ($Fe^{+2}$) state. The $Fe^{+2}$ can be readily absorbed and translocated by the plant.

Iron-efficient plants may also excrete phenolic compounds such as caffeic acid which chelate the soil iron making it available for uptake by the plants. The excretion of organic acids such as citric acid serve as natural iron chelators.

Current research indicates that efficient plants may utilize enzymatic reactions on the root surface that reduce iron and may be involved in the release of iron for plant use from iron-chelates.

Seeds of both efficient and inefficient tomato varieties were germinated between layers of moist cheesecloth on stainless steel screens. Selected day old seedlings were transferred to holes in a plastic ring supported on an eight liter plastic bucket containing a modified Steinburg nutrient solution. After one week in these chambers, the plants were transferred to a complete nutrient solution and allowed to adjust to a hydroponic culture for two weeks before the various treatments began. All plants were grown in light chambers with sixteen hours light (350u $Em^2s-1$) and eight hours dark, with a constant temperature of $25\pm2°$ C. The light source consisted of standard cool white fluorescent and sixty watt incandescent bulbs.

In the first experiment, the nutrient solutions were changed when the plants were 25 days old. The T3238 FER (iron efficient) plant treatments were nutrient solution without iron, 0.5 ppm iron as rhodotorulic acid siderophore, 0.5 ppm iron as $FeCl_3$, and 0.4 ppm iron as HEDTA.

The pH of each solution was measured daily beginning the day of initiation of the treatment and ending one week later on the day of termination of the experiment. At the termination of the experiment, the plants were harvested, dried in a forced air oven, and then ground with a mortar and pestle in preparation for iron determination.

In the second experiment, eight day old seedlings were transferred to 14 liters of nutrient solution containing 0.5 ppm iron for the iron-efficient tomatoes (T3238 Fer) and 2 ppm for the iron-inefficient tomatoes (T3238 Fer). More iron was required to keep the T3238 fer plants green.

When the plants were large enough to be used as test plants (19 days old), they were transferred to 14 liters of a modified Hoagland #1 nutrient solution ($NO_3$-N) minus iron and grown until the plants developed some chlorosis. The T3238 FER plants responded to the iron-stress by the release of hydrogen ions (lowering the pH of the solution) and the release of reductants that were capable of reducing $Fe^{+3}$ to $Fe^{+2}$.

At this stage (25 days old) of their growth, the plants were transferred to 14 liters of a modified Steinburg nutrient solution containing either no iron, 0.5 ppm iron added as FeHEDTA, or an iron siderophore. The plants were grown in these solutions for six days or until it was confirmed that the T3238 FER tomatoes were responding to the added iron as evidenced by regreening. At the termination of the experiment, the plants were harvested, dried in a forced air oven, and then ground with a mortar and pestle in preparation for iron determination. The plant tissue was analyzed for iron content and distribution. The top and bottom leaves, roots, and a stem excess were processed separately.

In the first experiment, after the T3238 FER (iron-efficient) tomatoes had developed some chlorosis and were responding to iron-deficiency by releasing H+ ions into the nutrient solution, the plants were transferred to the treatments containing iron as iron siderophore or FeHEDTA.

The pH profiles of the nutrient solutions throughout the course of the experiment are presented in FIG. 1. It can be seen that the minus-iron treatment exhibited the well-known depression of nutrient solution pH, typical of iron-stressed Fe-efficient plants grown in a $NH_4$ containing media.

The tomatoes exposed to an iron-siderophore treatment displayed an intermediate pH depression, when contrasted with the minus-iron and the FeHEDTA groups, the latter exhibiting only a slight drop in solution pH. The pH of the solutions remained similar until day 3 when the minus-iron plants began to display indications of chlorosis. By day five, chlorosis was severe in the minus-iron plants and when the pH reached the lowest value (4.6), reductants capable of reducing $Fe^{+3}$ to $Fe^{+2}$ were detectable in the nutrient solution indicating that the adaptive iron-stress response was operative. The Fe-siderophore and the FeHEDTA supplemented plants remained green through the duration of the experiment suggesting that adequate iron supplies were available.

Figure 2:
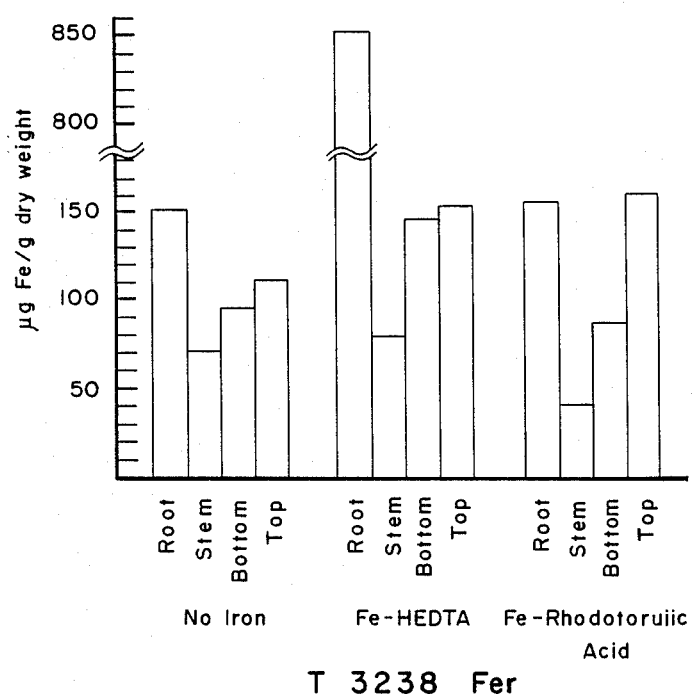
FIG. 2 is a graphical presentation of data showing the iron content and distribution in various plant parts following the experiments summarized by FIG. 1.

The total iron content of separately processed roots, top leaves, bottom leaves, and stem excesses for each treatment are presented in FIG. 2. It should be noted that the bottom leaves developed prior to the initiation of the treatments and that the root values reflect both internal and surface concentrations of iron. The stem excess values represent iron moving in the transpirational stream. The FeHEDTA exhibited approximately a 12% increase over the value of the minus-iron treatment, while the iron-siderophore treatment showed only 52% of the control value at the termination of the experiment.

Significantly, while the xylem values of the iron-siderophore treatment were lower than the FeHEDTA treatment, the iron concentration of the top leaves were comparable. The top leaves of the siderophore and the HEDTA treatments contained 30% and 27% respectively, more iron than the minus-iron control. This indicates that there was sufficient iron moving to the new growth to support normal plant growth.

In the second experiment, the experimental plants T3238 FER (iron-efficient) and T3238 fer (iron-efficient) were subjected to more severe iron-stress by growth in iron-free Hoaglands #1 solution containing only nitrate nitrogen prior to beginning the treatments. When the plants were prestressed in the Hoaglands #1 solution, the pH of the nutrient solution progressively became more alkaline, rising from an initial value of 5.7 to a maximum value of 6.7 on day 4 for T3238 FER and to a maximum value of 6.9 for T3238 fer on day 6. On day 5, the solutions bathing the T3238 FER became more acidic and reached a minimum of 3.7 on day 6 indicating severe iron-stress, at which time the plants were transferred to the Steinburg solutions and the treatments began.

Figure 3:
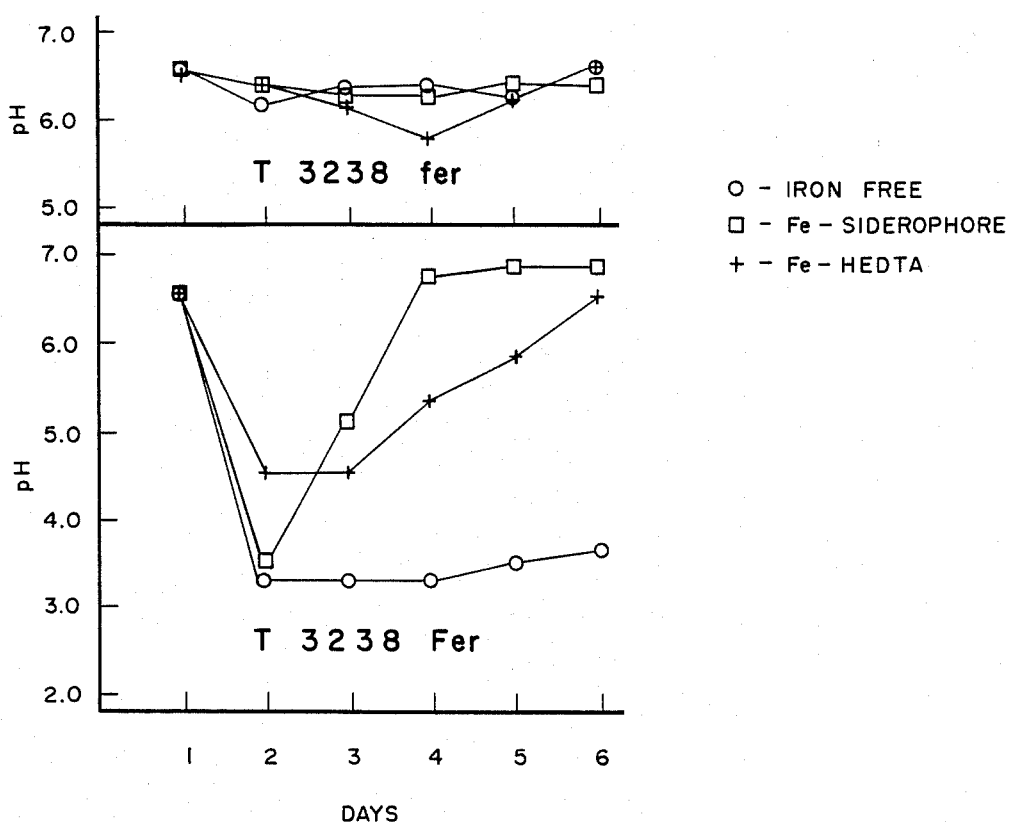
FIG. 3 is a graphical presentation of data indicating changes in solution pH over time in severely iron-stressed tomatoes.

The pH profiles of the Steinburg treatment solutions (minus-Fe, 0.5 ppm Fe-siderophore, or FeHEDTA) are shown in FIG. 3. It can be seen that the T3238 fer plants were incapable of modifying the pH of the nutrient solution and the plants remained chlorotic.

The T3238 FER plants depressed the nutrient solution pH to varying degrees in response to iron-stress. The minus-Fe control plants reduced the pH of the nutrient solution to 3.4 on day 2, and the value remained relatively constant to the termination of the experiment. The nutrient solution of the FeHEDTA treated plant showed a pH decrease to 4.6 on day 2, followed by a gradual increase reaching approximately original values of 6.7 on day 6. The nutrient solution of the iron-siderophore exposed plants exhibited a rapid decline in pH to 3.6, followed by a rapid alkalinization of the solution. By day 4 the pH had returned to 6.8, and this increased only slightly to pH 6.9 by the termination of the experiment on day 6. The iron-siderophore and FeHEDTA treatments resulted in the greening of the plants, while the minus-Fe control plants remained chlorotic.

Figure 4:
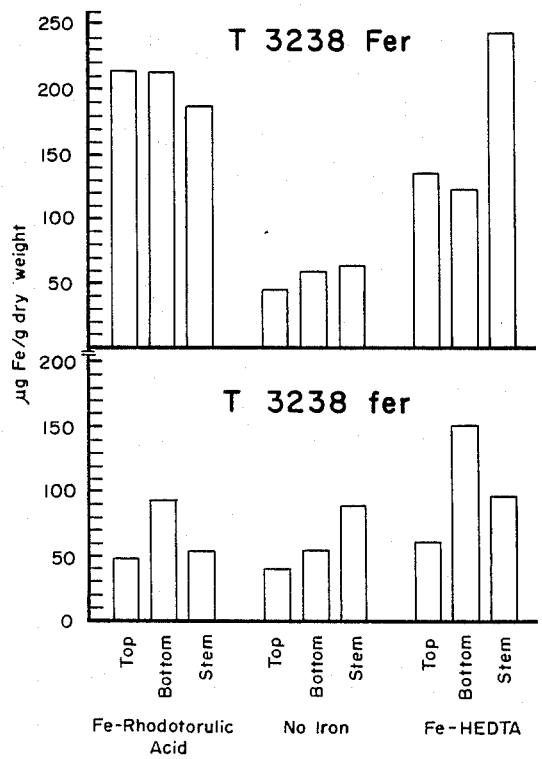
FIG. 4 is a graphical presentation of data showing the iron content and distribution in various plant parts following the experiments summarized by FIG. 3.

The total iron content of the top leaves, bottom leaves, and stem excess of T3238 FER and T3238 fer for each treatment were analyzed separately at the termination of the experiment. It can be seen in FIG. 4 that T3238 fer showed slight response to either the FeHEDTA or iron-siderophore treatment whereas the T3238 FER displayed a marked response. For example, the iron concentration in the top leaves of T3238 fer and T3238 FER for the minus iron treatments were 40 and 47; FeHEDTA treatments, 65 and 140 and the ferrated rhodotorulic acid treatments 47 and 215 ppm iron respectively.

Attempts to recover the siderophore from the nutrient solutions after the termination of the experiment revealed that approximately 75% was recoverable from the T3238 FER nutrient solutions, while 90–95% was found in the T3238 fer solutions. It was possible that the 25% not accounted for in the efficient plants could be adhered to the root surface, however, repeated root washing failed to reveal any additional siderophore.

These data are inconclusive, as it is not possible to determine whether the siderophore has been destroyed, assimilated along with the iron, or recycled into the nutrient solution. One important characteristic of siderophores of the type discussed above, however, is that when added to the environment surrounding plants, they tend to remain in the environment rather than being absorbed by the plant. Thus, it may be theorized that the siderophore simply acts as a carrier mechanism for presenting iron in usable form to the plant. It appears very possible that the siderophore may provide this function repeatedly. Thus, it is expected that unlike prior art treatments for iron chlorosis, the constant, frequent reapplications of the siderophore required by the prior art for the treatment of iron chlorosis will not be as necessary with the present invention.

It can be seen from the experiments described above that rhodotorulic acid can provide significant benefits to otherwise chlorotic plants. Particularly when applied to iron efficient plants, chelates of rhodotorulic acid provide readily observable benefits. Iron is provided to the new plant growth so that the plant is able to continue to produce. In addition, as can be seen from FIGS. 1 and 3, the addition of rhodotorulic acid allows the plant to recover from an iron-stress situation and return the surrounding environment to normal pH.

As a result, the methods and compositions described above provide an effective treatment for iron chlorosis in plants. This treatment is easy and inexpensive to produce and simply involves growing a strain of red yeast in an iron-free environment. As discussed in the experimental data section above, it is believed that plants do not readily absorb the siderophore and as a result it is expected that frequent reapplication of the siderophore will not be required. Thus, the rhodotorulic acid siderophore is capable of delivering iron to a plant in soluble, usable form, even in an alkaline environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced with their scope.

What is claimed and desired to be secured by United States Letters Patent is:

1. A method of treating iron chlorosis in plants comprising the step of administering to said plants a sufficient quantity of rhodotorulic acid to provide said plants with increased capacity to absorb iron in usable form.

2. A method of treating iron chlorosis in plants as defined in claim 1 wherein iron is added to said rhodotorulic acid before application to said plants to form an iron chelate of rhodotorulic acid.

3. A method of treating iron chlorosis in plants as defined in claim 1 further comprising the step of producing said rhodotorulic acid from a yeast.

4. A method of treating iron chlorosis in plants as defined in claim 3 wherein said yeast is rhodotorula pilimanae.

5. A method of treating iron chlorosis in plants as defined in claim 1 wherein said plants are dicots.

6. A method of treating iron chlorosis in plants as defined in claim 1 wherein said method results in increased greening of at least one of the following: existing leaves, new growth, or stems.

7. A method of treating iron chlorosis in plants as defined in claim 1 wherein said method results in at least one of the following: increased plant growth or increased crop production.

8. A method of treating iron chlorosis in plants as defined in claim 1 wherein said rhodotorulic acid is administered to said plants as a foliar spray.

9. A method of treating iron chlorosis in plants as defined in claim 1 wherein said rhodotorulic acid is administered to said plants by injection to said plants.

10. A method of treating iron chlorosis in plants as defined in claim 1 wherein said rhodotorulic acid is administered to said plants by being added to the soil surrounding said plants.

11. A method of treating iron chlorosis in plants as defined in claim 3 wherein said rhodotorulic acid is administered to said plants by adding said yeast to the soil surrounding said plants.

12. A method of increasing crop production in plants comprising the step of administering to crop producing plants a sufficient quantity of rhodotorulic acid in the form of a foliar spray to provide said plants with increased capacity to absorb iron in usable form.

13. A method of increasing crop production in plants as defined in claim 12 wherein said rhodotorulic acid is produced by the yeast rhodotorula pilimanae.

14. A method of increasing crop production in plants as defined in claim 12 wherein said plants are selected from the group consisting of dicots.

15. A method of increasing crop production in plants as defined in claim 12 wherein said method results in greening of at least one of the following: existing leaves, new growth, or stems.

16. A method of increasing crop production in plants as defined in claim 13 wherein said method results in at least one of the following: increased growth or increased crop production.

17. A method of increasing crop production in plants as defined in claim 12 wherein said foliar spray comprises from about 50 parts per million to about 250 parts per million iron in the form of ferrated rhodotorulic acid.

18. A method of increasing crop production in plants as defined in claim 17 wherein said foliar spray further comprises a wetting agent.

19. A foliar spray for use in treating iron chlorosis in plants comprising an aqueous solution of ferrated rhodotorulic acid.

20. A foliar spray for use in treating iron chlorosis in plants as defined in claim 19 comprising from about 50 parts per million to about 250 parts per million of iron.

21. A foliar spray for use in treating iron chlorosis in plants as defined in claim 20 comprising from about 0.5 grams per liter to about 2 grams per liter ferrated rhodotorulic acid.

* * * * *